March 14, 1933.  E. A. RYDER  1,901,358
CRANK SHAFT
Filed Jan. 24, 1931
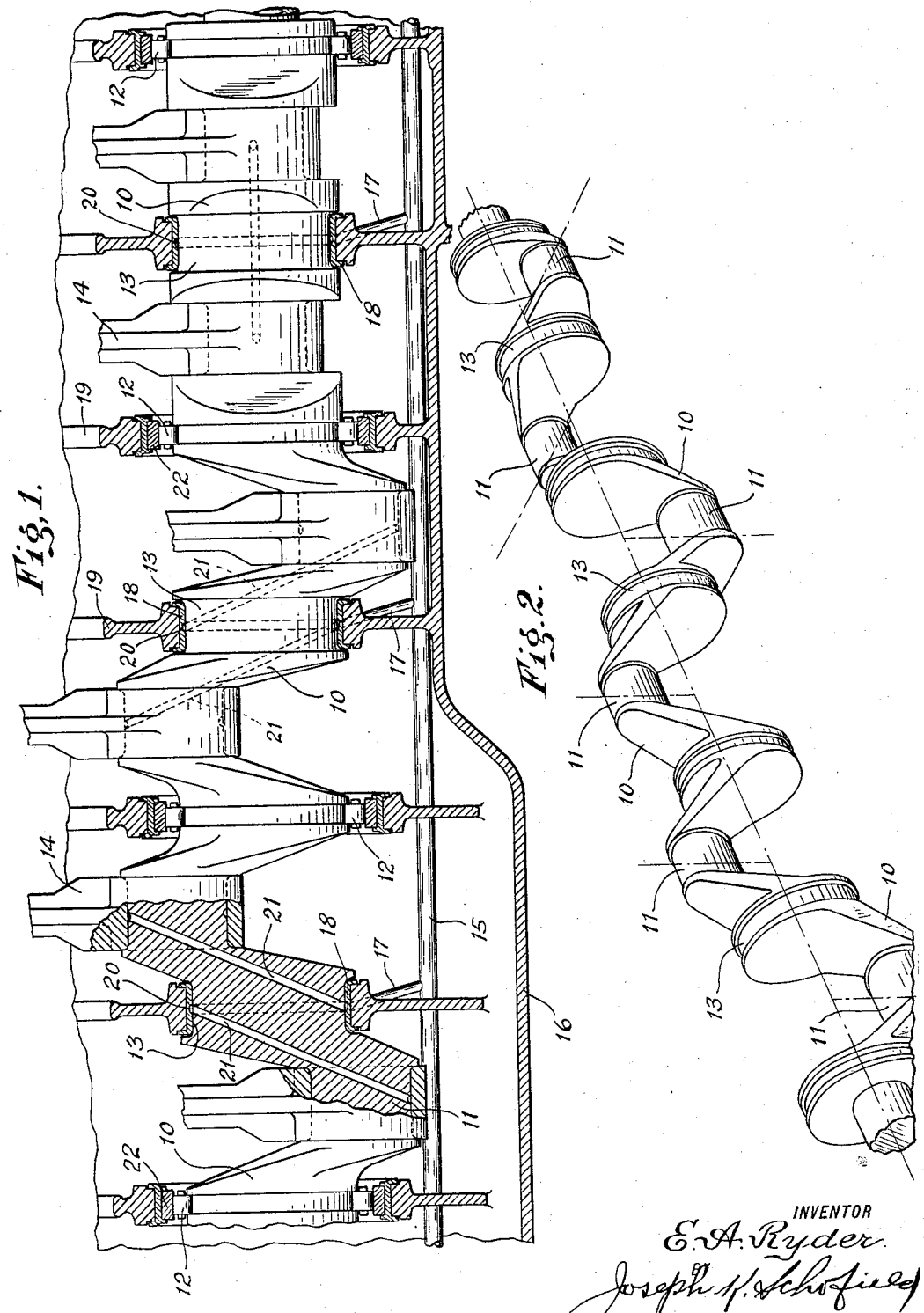
INVENTOR
E. A. Ryder
Joseph H. Schofield
ATTORNEY Patented Mar. 14, 1933

1,901,358

UNITED STATES PATENT OFFICE

EARLE A. RYDER, OF WEST HARTFORD, CONNECTICUT, ASSIGNOR TO THE PRATT & WHITNEY AIRCRAFT COMPANY, OF EAST HARTFORD, CONNECTICUT, A CORPORATION OF DELAWARE

CRANK SHAFT

Application filed January 24, 1931. Serial No. 510,950.

This invention relates to crank shaft constructions and particularly to crank shafts for internal combustion engines having a number of cranks disposed in different planes.

An object of the present invention is to provide improved supporting means for an engine shaft having a plurality of bearings, the supporting bearings being of different types, one type facilitating the distribution of lubricant to some of the cranks and the other bearings being particularly designed for withstanding heavy operating loads upon the shaft with minimum friction.

A feature which enables me to accomplish the above named object is that certain of the supporting surfaces on the crank shaft have plain journal portions, these being adapted to be supplied constantly with lubricant and in turn having connections for supplying lubricant to adjacent crank journals.

Another feature of importance is that those bearings not required for supplying lubricant to the crank journals are of the anti-friction type and are designed to sustain extremely heavy loads with minimum friction, no special lubricant supplying means being required.

And finally it is an object of the invention to provide a simple construction of main shaft construction having an extremely rugged and compact design, the bearings therefor being adapted to support the shaft under heavily loaded conditions while keeping the length of the bearings reduced as much as possible and maintaining the shaft and crank bearings properly lubricated.

With these and other objects in view, my invention includes the features of construction and operation set forth in the following specification and illustrated in the accompanying drawing.

In the accompanying drawing annexed hereto and forming a part of this specification, I have shown my invention embodied in a crank shaft for an internal combustion engine having a large number of separate cranks, but it will be understood that the invention can be otherwise embodied and that the drawing is not to be construed as defining or limiting the scope of the invention, the claim appended to this specification being relied upon for that purpose.

In the drawing:

Figure 1 is a view in side elevation, partly in section, showing a portion of a crank shaft embodying the present invention.

Fig. 2 is a perspective view of the crank shaft shown in Fig. 1.

In the above mentioned drawing I have shown but one embodiment of the invention which is now deemed preferable, but it is to be understood that changes and modifications may be made within the scope of the appended claim without departing from the spirit of the invention.

In the manufacture of heavy duty and high speed engines of the internal combustion type in which a large number of cylinders in line are employed, each having its crank upon the main crank shaft, it is highly desirable that the shaft be supported for rotation with minimum friction. Furthermore, it is desirable that ample lubricant be supplied to all sliding surfaces. Modern practice is such, and the requirements of weight and space necessitate, particularly in automotive and aircraft engine design, that the bearings be made as short as possible so that the overall length of the main shaft may be reduced as much as practicable. For that reason it has been found desirable to support the main shaft upon a number of anti-friction bearings, these not only having a minimum friction but being very short and capable of supporting maximum loads. With an engine equipped throughout with bearings of the anti-friction type, however, the only feasible way of supplying lubricant to the journals upon the cranks is by a continuous passage extending throughout the length of the main shaft. Such a lubricant passage is extremely difficult and expensive to provide, particularly in long shafts, due to the large number of separate drilling and other operations required. Another difficulty with this type of lubricant supplying means is that the fluid under pressure being supplied at one end of an elongated shaft the supply to the cranks at the opposite end thereof is uncertain and frequently apt to be insufficient for proper lubrication.

It is proposed, therefore, to rotatably support the main shaft upon bearings of two distinctly different types. Use is made of anti-friction bearings for those bearings which are called upon to carry maximum loads. The other type of bearing is selected so that lubricant may be supplied therefrom to adjacent crank journals. These bearings are or may be of the plain or cylindrical journal type and may be utilized in those places where the bearings are not called upon to withstand the maximum loads. A lubricant supplying system may provide lubricant to the plain journal bearings upon the main shaft, and, by means of annular grooves and conduits the journal surfaces upon adjacent cranks may be supplied with lubricant.

It is known that the loads upon main bearings between adjacent cranks of a multi-throw internal combustion engine vary widely in accordance with the order of firing of the cylinders and the relative angular disposition of adjacent cranks. A typical crank shaft for a multi-cylinder internal combustion engine is shown in the figures of the drawing, the cranks being disposed in planes at different angles relative to each other, either at right angles to each other, directly opposed to each other, or in the same angular relation. Upon those main shaft supporting bearings disposed between cranks directly opposite to each other, relatively lighter loads are imparted, whereas in those cases where adjacent cranks are at right angles to each other or in the same plane, greatly increased pressures or loadings take place. The angular disposition of the cranks will, of course, depend upon the selected order of firing of the cylinders and whether the engine is of the two or four cycle type. By the proper selection of this firing order and angular disposition of cranks, the loads upon the bearings may be such that the bearings upon the main crank shaft preferably may be alternately plain journal bearings and anti-friction, such as roller bearings. This is the arrangement of bearings selected to illustrate a preferred form of the invention in the figures of the drawing.

Referring more in detail to the figures of the drawing, I illustrate one end of a long main crank shaft 10, six cranks 11 being shown of a standard form of crank shaft for an eight cylinder internal combustion engine. Disposed between each of these cranks 11 of the main shaft 10 are main bearings of two types 12 and 13, seven bearings being shown. These main bearings, as indicated, are each in alinement, one with the other, and alternately of the anti-friction or roller type bearings shown at 12 and plain cylindrical journal bearings shown at 13. As the plain journal bearings 13 are old and well-known and the type of anti-friction bearings 12 may be of standard form, further description of these bearings is not thought to be necessary. The specific forms of the bearings 12 and 13 do not constitute a part of the present invention. The bearing surfaces for the connecting rods 14 upon the journal surfaces of the cranks 11 are shown as being of the plain cylindrical journal type and supplied with lubricant in a manner presently to be described.

A main lubricant supply conduit 15 is provided suitably supported within the base 16 of the engine and having branches or connections 17 to the bearing surfaces within the base 16 for the plain cylindrical journals 13 of the main crank shaft 10. Preferably semi-circular ring bearing members 18 may be inserted within the recesses within the engine frame member 19 and the base 16, the inner surfaces of which form the bearing surfaces for the journals of the crank shaft bearings 13. The lubricant supplied by these branches 17 enters an annular groove 20 within these ring bearing members 18 surrounding the journal surfaces of bearings 13 so that a constant supply of oil is furnished to the sliding surfaces of these bearings. Passages shown as holes 21 drilled directly through the flanges of the main shaft between the main journals 13 and the journals of the cranks 11 permit lubricant to pass from the annular groove 20 directly through portions of the main crank 10 to the bearing surfaces upon the cranks 11. Preferably and as shown in Fig. 1, two of these passages extend from each plain cylindrical journal 13 and furnish lubricant to the bearings of the cranks 11 on opposite sides of the main bearing.

The anti-friction bearings 12 are shown as having their rollers directly in contact with recessed cylindrical surfaces formed on the main shaft 10, their outer rings 22 being retained in semi-circular ring members 23 inserted within the engine frame member 18 and base 16.

During operation the shaft 10 is rotated at high speed and lubricant is supplied under pressure to the conduit 15. This lubricant through the branch conduits 17 enters the annular recesses 20 within the bearing members 18 and spreading outwardly lubricates the sliding surfaces of the plain journals 13. The amount of lubricant supplied through the branch conduits 17 is sufficient to maintain the annular grooves or recesses 20 completely filled so that some of the lubricant will enter the passages 21 to the journals of the cranks 11 and spreading out will amply lubricate the entire journal surfaces of the cranks. The anti-friction bearings 12 do not require lubrication to such an extent that they need to be included within the pressure system.

What I claim is:

An engine crank shaft construction comprising, a shaft having a plurality of cranks thereon, a plurality of alined bearings for supporting said shaft, said bearings being alternately of plain journal and anti-friction types, said cranks having plain journal surfaces, continuous lubricant supplying means for said journal shaft bearings, and means provided within said shaft supporting bearings and said shaft whereby said cranks may be lubricated.

In testimony whereof, I hereto affix my signature.

EARLE A. RYDER.